United States Patent [19]

Kapuscinski et al.

[11] Patent Number: 5,424,366
[45] Date of Patent: Jun. 13, 1995

[54] MULTIFUNCTIONAL VISCOSITY INDEX IMPROVER CONTAINING PHENOTHIAZINE

[75] Inventors: Maria M. Kapuscinski, Carmel; Theodore E. Nalesnik, Wappingers Falls; Robert T. Biggs, Walden; Benjamin J. Kaufman, Hopewell Junction, all of N.Y.

[73] Assignee: Texaco Inc., White Plains, N.Y.

[21] Appl. No.: 252,390

[22] Filed: Jun. 1, 1994

Related U.S. Application Data

[60] Continuation of Ser. No. 40,814, Mar. 31, 1993, abandoned, which is a division of Ser. No. 690,241, Apr. 24, 1991, Pat. No. 5,200,100.

[51] Int. Cl.$^6$ .................. C08F 255/04; C08F 255/06; C10M 149/10; C10M 149/04
[52] U.S. Cl. ..................... 525/279; 525/284; 525/286; 525/322; 252/47; 252/47.5
[58] Field of Search ............... 525/279, 286, 322, 284

[56] References Cited

U.S. PATENT DOCUMENTS 4,170,561 10/1979 Chapelet et al. ............ 252/51.5 A
4,816,172 3/1989 Kapuscinski et al. ............ 525/73

Primary Examiner—Vasu S. Jagannathan

[57] ABSTRACT

Multi-functional viscosity index improvers for lubricating oils containing an EPM or EPDM polymer onto which has been grafted an unsaturated functional monomer containing phenothiazine.

8 Claims, No Drawings

MULTIFUNCTIONAL VISCOSITY INDEX IMPROVER CONTAINING PHENOTHIAZINE

This is a continuation of application Ser. No. 08/040,814, filed on Mar. 31, 1993 abandoned which is a continuation, division, of application Ser. No. 07/690,241, filed Apr. 24, 1991 now U.S. Pat. No. 5,200,100.

BACKGROUND OF THE INVENTION

This invention relates to a novel multi-functional lubricant additive which is a dispersant, antioxidant and antiwear VI improver additive when employed in a lubricating oil composition.

It is well known to those skilled in the art that hydrocarbon lubricating oils must be formulated by addition of various additives to improve their properties.

In the case of lubricating oils, typified by those employed in railway, automotive, aircraft, marine, etc., service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, antiwear properties, etc.

It is, therefore, an object of this invention to provide an additive system which imparts to lubricating oils these improved properties of viscosity index, dispersancy, antiwear properties and oxidative stability. Other objects will be apparent to those skilled in the art.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil additive.

U.S. Pat. No. 3,522,180 discloses a method for the preparation of an ethylene-propylene copolymer substrate effective as a viscosity index improver for lubricating oils.

U.S. Pat. No. 4,089,794 discloses ethylene copolymers derived from ethylene and one or more ($C_3$ to $C_{28}$) alpha-olefin solution grafted with an ethylenically-unsaturated carboxylic acid material followed by a reaction with a polyfunctional material reactive with carboxyl groups, such as a polyamine, a polyol, or a hydroxylamine, which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinyl-pyridine or N-vinylpyrrolidone to provide a dispersant VI improver for lubricating oils.

U.S. Pat. No. 4,820,776 discloses lubricants and fuel oils of improved properties containing ethylene-propylene copolymer derived with N-vinyl pyrrolidone and phenothiazine.

U.S. Pat. No. 4,320,019 discloses a multipurpose lubricating additive prepared by the reaction of an interpolymer of ethylene and a ($C_3$-$C_8$) alpha-monoolefin with an olefinic carboxylic acid acylating agent to form an acylating reaction intermediate which is then reacted with an amine.

U.S. Pat. No. 4,764,304 discloses a lubricating oil dispersant VI improver composition containing an additive prepared by the reaction of an olefin copolymer and an unsaturated isocyanate to form reactive intermediate which is then reacted with heterocyclic amines.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxylamine and finally reacted with an alkaryl sulfonic acid.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,820,776, 4,320,019, 4,340,689, 4,357,250, and 4,382,007 are incorporated herein by reference.

Another object is to provide a process for preparing a derivatized copolymer with an unsaturated chloride to form a reactive intermediate which is then reacted with an antioxidant aromatic hindered amine.

An object of this invention is to provide a novel derivatized polymer composition which imparts viscosity index improving, dispersant, antiwear and antioxidant activity to lubricating oil compositions.

Also the present invention is directed to a method of making dispersant/antioxidant VI improvers based on a polymer prepared in a two-step process which comprises using olefin copolymers as a polymer base derived with unsaturated chlorides and hindered aromatic amines. First, unsaturated isocyanate is grafted under elevated temperatures with the addition of a free radical initiator. the grafting reaction is followed by a capping of a hindered aromatic amine.

Still another object is to provide a process for preparing a derivatized copolymer with graft monomers formed from a reactive unsaturated chloride and aromatic hindered amine to yield a modified copolymer which performs as a viscosity index improver, dispersant, antiwear agent and antioxidant in lubricating oil.

Still another object of this invention is to provide a multi-functional lubricant additive effective for imparting viscosity index, dispersant, antiwear and antioxidant properties to a lubricating oil composition.

SUMMARY OF THE INVENTION

The present invention is directed to a method of making multi-functional VI improvers based on a polymer prepared by grafting olefin copolymers being a polymer base with monomer derived from unsaturated compound containing reactive groups such as anhydride, epoxide, isocyanate or azlactone and phenothiazine-derivative containing amine group.

The multi-functional VI improvers are made in a one-step process. An unsaturated monomer containing phenothiazine is grafted onto polymer under elevated temperatures with addition of a free radical initiator. The following reaction illustrates the process of the invention:

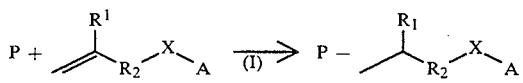

wherein I is a free radical initiator, P is a polymer selected from the group consisting of ethylene-propylene copolymer, ethylene-propylene diene terpolymer, hydrogenated styrene-butadiene copolymer, styrene hydrogenated isoprene or butadiene copolymer, and hydrogenated isoprene polymer; $R_1$ is a hydrogen or an organic linear, cyclic or heterocyclic, and aromatic or heteroaromatic group composed of hydrocarbon and/or one or more atom of oxygen, nitrogen, sulfur or phosphorus; and $R_2$ is an organic linear, cyclic or heterocyclic, and aromatic or heteroaromatic unit composed of hydrocarbon and/or one or more atom of oxygen, nitrogen, isocyanate, azlactone, chloride, ketone, aldehyde group or ester group.

x—is a unit derived from the reactive group (epoxide, azlactone, isocyanate, etc.) of the unsaturated compound reacted with phenothiazine derivative containing amine group A—is a group derived from a phenothiazine derivative containing amine group having the following general structure:

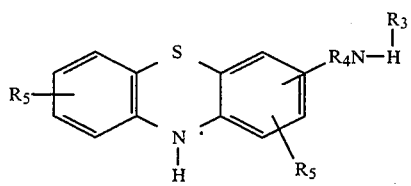

where:
$R_3$ is H or $R_2$
$R_4$ is $R_2$
$R_5$ is $R_1$

The novel reaction product of the invention preferably is prepared using ethylene-propylene copolymer (EPM) or ethylene-propylene diene terpolymer (EPDM) as a polymer base, a monomer derivatized from a glycidyl methacrylate and aminoalkyl phenothiazine.

The lubricant additive of the present invention comprises an oil of lubricating viscosity and an effective amount of the novel reaction product. The lubricating oil will be characterized by having viscosity index improver, dispersancy, antiwear and antioxidant properties. The methods of preparation are also contemplated.

DETAILED DESCRIPTION OF THE INVENTION

This invention, as discussed briefly above, is directed to a polymer comprising an oil-soluble, substantially linear, carbon-carbon backbone polymer bearing functional units thereon, derived from an unsaturated monomer containing reactive groups such as maleic anhydride, glycidyl methacrylate, isocyanatoethyl methacrylate or vinyl azlactone and amine substituted phenothiazine.

The charge polymer which may be employed in the practice of the present process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping:

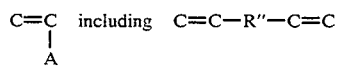

wherein A may be a hydrogen, hydrocarbon such as alkyl, aryl (particularly phenyl) etc., -OOCR typified by acetate or less preferred acyloxy (typified by -OOCR), halide, epoxy, benzyl, etc. R″ may be divalent hydrocarbon typified alkylene, alkarylene, cycloalkylene, arylene, etc.

The polymer or copolymer substrate employed in the novel additive of the invention may be prepared from ethylene and propylene or it may be prepared from ethylene and a higher olefin within the range of $C_3$ to $C_{10}$ alpha-monoolefins. The polymer or copolymer substrate may also be prepared from isoprene, styrene or butadiene.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 5-ethylidene-2-norbornene.

The polymer and copolymers prepared from the above-mentioned monomers having short and long branches or star shape structure may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions, preferably Ziegler-Natta reaction conditions. The preferred EPM copolymers contain units derived from the ethylene in amount of 40-90 mole %, preferably 55-80 mole %, say 59 mole %, the remainder being derived from propylene.

The molecular weight $\overline{M}_n$ of the EPM copolymers which may be employed may be about 5,000 to about 1,000,000, preferably about 20,000 to about 200,000, and most preferably about 80,000. The molecular weight distribution may be characterized by $\overline{M}_w/\overline{M}_n$ of less than about 15, preferably 1.2–10, say 1.8.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclopentadiene; 1,4-hexadiene; ethylidene norbornene or vinyl norbornene. Polymerization is effected under known conditions generally comparable to those employed in preparing the EPM products. The preferred terpolymers contain units derived from ethylene in amount of 40–90 mole % preferably 50–65 mole % say 59 mole % and units derived from propylene in an amount of 20–60 mole %, preferably 30–50 mole % say 41 mole % and units derived from diene third monomer in amount of 0.05–15 wt % preferably 0.1–3 wt %, say 0.3 wt %. The molecular weight $\overline{M}_n$ of the terpolymers may typically be about 5,000 to about 500,000, preferably about 20,000 to about 200,000, and most preferably about 80,000. Molecular weight distribution of the useful polymers is preferably narrow viz a $M_w/M_n$ of typically less than 10, preferably 1.5–5, say about 2.2.7

It is a feature of the process of this invention that the additive is prepared in a one-step process. The graft reactive monomer containing phenothiazine is grafted in the presence of a free radical initiator onto the polymer backbone. This polymer is then dissolved in oil to form multi-functional VI improvers.

THE GRAFT FUNCTIONAL MONOMER

It is a feature of the process of this invention that the graft functional monomers which may be employed (within a polymeric configuration) may be prepared from phenothiazine derivative containing amine group and unsaturated compound containing carbon-carbon double bond reactive groups such as epoxide, anhydride, isocyanate, aidehyde, or azlactone groups. Although the graft monomer may contain more than one ethylenically unsaturated carbon-carbon double bond or reactive group in a preferred embodiment it may contain one of each. Graft monomers containing more than one ethylenically unsaturated carbon-carbon double bond are much less preferred because of the high probability of cross-linking during subsequent reaction.

According to the present invention, the graft functional monomers may be prepared from aminoalkylphenothiazine and one of the following unsaturated compounds: glycidyl methacrylate, allyl glycidyl ether, vinyl benzyl chloride, itaconic anhydride, vinyl azlactone, isocyanato ethylmethacrylate (IEM), a,a-dimethyl meta-isopropenyl benzyl isocyanate, allyl isocyanate, isocyanato-n-butyl methacrylate, o- or p-isocyanato styrene, and croton aidehyde.

It is a feature of the process of this invention that the graft functional monomer may be grafted onto carbon-carbon backbone polymers in the presence of a free radical initiator.

THE GRAFTING REACTION

In the practice of the process of this invention, 100 parts of charge EPM or EPT may be added to 100–1000 parts, say 300–60 parts of diluent-solvent. Typical diluent-solvent may be a hydrocarbon solvent such as mineral oil, n-hexane, n-heptane, or tetrahydrofuran. Preferred solvent may be a commercial hexane containing principally hexane isomers or a commercial mineral grafting oil. Reaction mixture may then be heated under nitrogen to reaction conditions of 60° C.–180° C., preferably 150° C.–170° C., say 155° C. When n-hexane or other low boiling solvent is used, reaction is carried out in pressure reactor at 15–300 psig, preferably 180–220 psig, say 200 psig.

A graft monomer typically prepared from glycidyl methacrylate or vinylbenzyl chloride and aminoalkyl phenothiazine is admitted in an amount of about 1–40 parts, preferably 3 to 8 parts. There is also added a free radical initiator in solution in grafting solvent. Typical free radical initiators may include dicumyl peroxide, di-t-butyl peroxide, benzoyl peroxide, di-isopropyl peroxide, azobisisobutyro-nitrile, etc. The solvent is preferably the same as that in which the EPM or EPT is dissolved. The initiator may be added in amount of 0.2–40 parts, say 2 parts in 0.8–120 parts, say 4 parts of solvent. The preferred free radical initiator is a dicumyl peroxide (DICUP).

The reaction is carried out at a temperature at least as high as the decomposition temperature of the initiator, typically 150° C.–160° C. or higher for the time needed for bonding the graft reactive monomer onto the base EPM or EPT polymer.

The product graft polymer may be characterized by the presence of pendant reactive groups containing phenothiazine units bonded to the polymer backbone through the residue of the graft monomer, the latter being bonded to the polymer backbone through one of the carbon atoms which formed the ethylenically unsaturated double bond.

Typically, the graft product polymer may contain 0.1–20, say 0.4 units, derived from graft monomer per 1000 carbon atoms of the charge backbone polymer.

For ease of handling, enough mineral oil, such as SUS 100 oil typified by SNO-100 is then added to obtain a fluid concentrate product at room temperature. The product is typically obtained as a solution of about 4 to about 20 parts in about 80 to about 96 parts of oil. When the grafting reaction is carried out in hexane (or other low boiling solvent), a stripping step is included.

The fluid solution (a lubricating additive) is used for further testing.

It is a feature of this invention that the so-prepared polymer solution in oil may find use in lubricating oils as multi-functional additive (e.g., dispersant viscosity index improvers which provide antiwear and antioxidant properties, etc.) when present in effect amount of about 1.0 to about 20 wt %, preferably 3–15 wt %, preferably about 9 wt %.

Lubricating oils in which the multi-functional additives of this invention may find use may include automotive, aircraft, marine, railway, etc., oils; oils used in spark ignition or compression ignition; summer or winter oils, etc. Typically, the lubricating oils may be characterized by a b.p. of about 570° F. to about 660° F., preferably 610° F.; an e.p. of about 750° F. to about 1200° F., preferably 1020° F.; an API gravity of about 25 to about 31, preferably about 29.

A typical lubricating oil in which the polymer of this invention may be present may be a standard SAE 5W-30 hydrocarbon motor oil formulation having the composition as set forth below in Table 1.

TABLE 1

| | Wt % |
|---|---|
| Base oil | 82 |
| Viscosity Index Improver (additive of this invention) | 9 |

TABLE 1-continued

| | Wt % |
|---|---|
| (10 w % ethylene-propylene copolymer in 90% inert oil) | |
| Standard Additive Package: | 9 |
| polyisobutenyl (M1290)$_n$ succinimide (dispersant) | |
| calcium sulfonate (detergent) | |
| zinc dithiophosphate (antiwear) | |
| di-nonyl diphenyl amine (antioxidant) | |
| 4,4'-methylene-bis (2,6-di-t-butyl phenol) (antioxidant) | 10 |

Use of the additive of this invention makes it possible to readily increase the viscosity index by 25–40 units, say 35 units, and to obtain improved ratings on the tests measuring the dispersancy of the system. The viscosity index is determined by ASTM Test D-445.

The present invention comprises making dispersant, antiwear and antioxidant VI improvers by derivatizing hydrocarbon polymers such as ethylene-propylene copolymer (EPM) or ethylene-propylene-diene terpolymer (EPDM) with, e.g., graft reactive monomer containing phenothiazine.

Addition of the above invention additives to a lubricating oil may be facilitated by use of a concentrate containing about 1 to about 20 wt %, preferably about 4 to about 14 wt % of polymer.

The tests and analysis used, according to the present invention, are provided below.

TESTS AND ANALYSIS

1. Oxidation Stability

The antioxidant activity of the new multi-functional VI improver was examined by a proprietary test called the Bench Oxidation Test (BOT). In this test, the polymer solution is diluted with SNO-130 oil. The mixture is heated with stirring and air agitation. Samples are withdrawn periodically for analysis, by differential infrared analysis (DIR) to observe changes in the intensity of the carbonyl vibration band at 1710 cm$^{-1}$. Higher carbonyl group intensity indicates a lower thermal oxidative stability of the sample. The result reported, as oxidation index, indicates the change in the intensity of the carbonyl vibration band at 1710 cm$^{-1}$ after 144 hours of oxidation. A lower rating indicates better thermal oxidative stability of the mixture.

2. Dispersancy

The sample is blended into a formulated oil, not containing a dispersant, to form 10.0 wt % viscosity index improver solution. That blend is tested for dispersancy in the prototype VE Test. In this test, the turbidity of an oil containing an additive is measured after heating the test oil to which has been added a standard blow-by. The result correlates with dispersancy and is compared to three standards (excellent, good, fair) tested simultaneously with the test sample. The numerical rating decreases with an increase in dispersant effectiveness. Results above 100 indicate that the additive does not provide dispersant activity.

3. Antiwear Properties

Antiwear performance of a new VI improver was determined by a Four-Ball Test (NMS-82-79, ASTM D-2266, ASTM4172). The VI improver solutions in formulated oil, having Kinematic Viscosity at 100° C. around 16 cSt were evaluated.

In this test, four balls are arranged in an equilateral tetrahedron. The lower three balls are clamped securely in a test cup filled with lubricant and the upper ball held by a chuck which is motor driven, causing the upper ball to rotate against the fixed lower balls. Load is applied in an upward direction through a weight/lever arm system. Heaters allow operation at elevated oil temperatures. The test speeds available for each tester are 600 rpm, 1200 rpm, and 1800 rpm. Results are reported as average scar diameter (mm).

The amount of amino alkyl phenothiazine incorporated onto OCP in the grafting process is determined by IR-analysis of isolated rubber. The phenothiazine on the polymer is determined by aromatic stretch at 1610 cm$^{-1}$. The rubber is isolated from solution by multiple precipitation using cyclohexane as a solvent and acetone as precipitator. The rubber (isolated as a solid) is dried in vacuum at 60° C. for 36 hours.

DESCRIPTION OF THE PREFERRED EMBODIMENTS

The practice of the process of this invention will be more apparent to those skilled in the art from the following examples wherein, as elsewhere in this specification, all parts are parts by weight unless otherwise set forth. Control examples are designated by an asterisk.

EXAMPLE I

In this example, a monomer was prepared from glycidyl methacrylate (GMA) and aminoalkyl phenothiazine prepared by Uniroyal Chemical Co. 23.9 g of aminoalkyl phenothiazine, 14.2 g of GMA and 20 g of THF were mixed and heated at 70° C. for 0.5 to 5 hours. THF was distilled out under vacuum. The product was used as is for grafting reaction.

EXAMPLE II

In this example, a monomer was prepared from vinyl benzyl chloride (VBC) and aminoalkyl phenothiazine 23.9 g ($\neq$0.1 mole) of aminoalkyl phenothiazine, 67.02 g (0.12 mole) of calcium oxide, and 19 g of THF were mixed together. Then, 15.6 g (0.10 mole) of VBC was added dropwise and the reaction mixture was maintained at 70°–80° C. with stirring for 2 hours. The solid calcium derivatives were removed from the reaction mixture by ultracentrifuging of the reaction mixture diluted with THF. Next, the THF was distilled off under vacuum. The product was used as is for grafting reaction.

EXAMPLE III

The monomer prepared as described in Example I is grafted onto EPM containing approximately 0.3 wt % of vinyl norbornene and 60 mole % of ethylene in the presence of a free radical initiator, dicumyl peroxide. EPM having a number average molecular weight (Mn)=80,000 as measured by SEC was used. 100 w. parts of EPM dissolved in mineral grafting oil (32.2 wt % polymer concentration) was heated to 155° C. with stirring under nitrogen). 6.0 wt. parts of monomer was added followed by 3.0 wt. parts of dicumyl peroxide dissolved in 6 wt. parts of grafting oil. The mixture is stirred using above conditions for 2 hours. Then, the solvent neutral oil (SNO-100) was added to give a solution containing 13 wt % polymer. This solution is used as is for further testing.

EXAMPLE IV

In this example, the procedure of Example III was followed, except that the monomer of Example II was used.

EXAMPLE V

In this example, 13 wt % EPM solution in mineral oil was prepared. 100 parts of EPM dissolved in grafting oil (32.2 wt % polymer solution) which was used in Examples III and IV, was diluted with SNO-100 oil to give polymer concentration of 13 wt %. The mixture was heated to 155° C. with stirring and under nitrogen for 3 hours until the rubber was completely dissolved.

RESULTS

The evaluation data for the samples of Examples III, IV and V, are listed below in Table 2. The sample numbers are related to the example numbers.

As seen in Table 2, the sample of Example III containing the rubber grafted with monomer of Example I shows excellent antioxidant, dispersant and antiwear activity. Sample IV also exhibits excellent antiwear and some dispersant or antioxidant activity. The reference sample of Example V* containing unmodified rubber did not show any dispersant, antiwear or antioxidant activity.

The above data indicate that EPM or EPDM copolymers modified by grafting monomers containing phenothiazine in presence of free radical initiators form multifunctional VI improvers exhibiting dispersant, antiwear and antioxidant performance in motor oils.

TABLE 2

| | Properties of VI Improvers | | |
|---|---|---|---|
| SAMPLE | III | IV | V* |
| MATERIAL wt. parts | | | |
| EPM (0.3 diene) | 100 | 100 | 100 |
| Monomer of Example I | 6.0 | — | — |
| Monomer of Example II | — | 6.0 | — |
| DICUP | 3.0 | 3.0 | — |
| Grafting oil | 331.8 | 331.8 | 332.8 |
| Diluent oil | 263.4 | 263.4 | 262.6 |
| OXIDATION INDEX(1) | 3.4 | 14.0 | 19.0 |
| ANTIWEAR PROPERTIES mm(2) | 0.52 | 0.36 | 1.4 |
| BENCH DISPERSANCY(3) | | | |
| Result | 48 | 125 | 200 |
| Standards | | 30/36/95 | |

(1) Change in the intensity of the carbonyl group IR vibration at 1710 cm$^{-1}$ after 144 hours in BOT
(2) Four Ball Wear Test. 1800 rpm, 200° F., 40 kg, 2 hrs. 15W-40 formulation.
(3) As measured by Prototype Bench VE Test

We claim:

1. A method of preparing a substantialby linear polymer composition containing a carbon-carbon backbone which comprises: forming a reaction mixture containing a substantially linear, carbon-carbon backbone polymer graff polymerizing onto said substantially linear carbon-carbon backbone polymer, under graft, polymerization reaction conditions in the presence of free radical initiator, a graft functional monomer prepared by reaction of an aminoalkyl phenothiazine and an unsaturated compound containing a group reactive with the amine group containing aminoalkyl phenothiazine.

2. A method of preparing a substantially linear polymer composition containing a carbon-carbon backbone as claimed in claim 1 wherein said graft functional monomer is derived from unsaturated compound containing epoxide group and said aminoalkyl phenothiazine.

3. A method of preparing a substantially linear polymer composition containing a carbon-carbon backbone as claimed in any one of claims 1 or 2 wherein said backbone polymer is a copolymer of ethylene-propylene or a terpolymer of ethylene-propylene-diene.

4. A method of preparing a substantially linear polymer composition containing a carbon-carbon backbone as claimed in claim 1 wherein said graft functional monomer is derived from glycidyl methacrylate or allyl glycidyl ether and amino alkyl phenothiazine.

5. A method of preparing a substantially linear polymer composition containing a carbon-carbon backbone as claimed in claim 1 wherein said graft functional monomer is an unsaturated compound derived from unsaturated chloride and said aminoalkyl phenothiazine.

6. A method of preparing a substantially linear polymer composition containing a carbon-carbon backbone as claimed in claim 1 wherein said graft functional monomer is derived from vinylbenzyl chloride and aminoalkyl phenothiazine.

7. A method of preparing a substantially linear polymer composition containing a carbon-carbon backbone as claimed in claim 1 wherein said graft functional monomer is derived from said aminoalkyl phenothiazine and compound containing isocyanate, azlactone, anhydride, aldehyde or ketone group.

8. A method according to claim 1, wherein the graft functional monomer is prepared by reaction of an aminoalkylphenothiazine and an unsaturated compound selected from the group consisting of glycidyl methacrylate, allyl glycidyl ether, vinyl benzyl chloride, itaconic anhydride, vinyl azlactone, isocyanato, ethylmethacrylate (IEM), α,α-dimethyl meta-isopropenyl benzyl isocyanate, allyl isocyanate, isocyanato-n-butyl methacrylate, o or p-isocyanatostyrene, croton aidehyde.

* * * * *

UNITED STATES PATENT AND TRADEMARK OFFICE
CERTIFICATE OF CORRECTION

PATENT NO. : 5,424,366
DATED : June 13, 1995
INVENTOR(S) : Kapuscinski et al.

It is certified that error appears in the above-identified patent and that said Letters Patent is hereby corrected as shown below:

Column 10:

Claim 1, lines 10 and 11, delete "amine group containing".

Signed and Sealed this

Twentieth Day of February, 1996

Attest:

BRUCE LEHMAN

*Attesting Officer*　　*Commissioner of Patents and Trademarks*